Aug. 15, 1950
A. A. GRIFFITH
2,519,130
COMPOUND GAS-TURBINE POWER PLANT
WITH PARALLEL FLOW TURBINES
Filed July 29, 1946
3 Sheets-Sheet 3
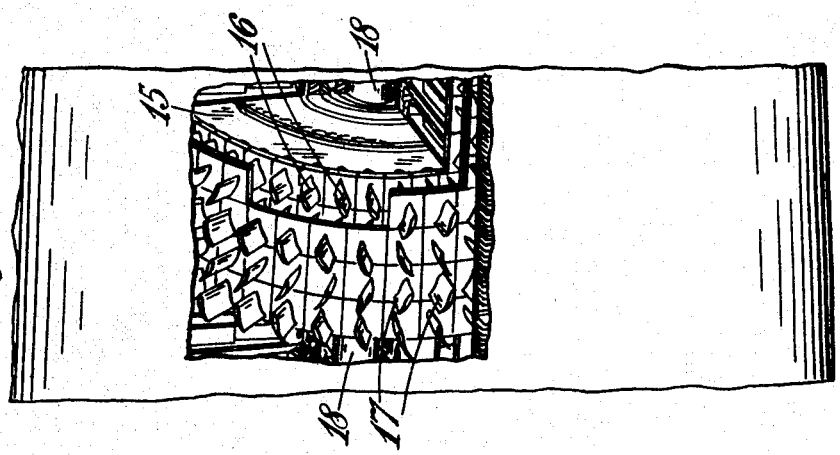
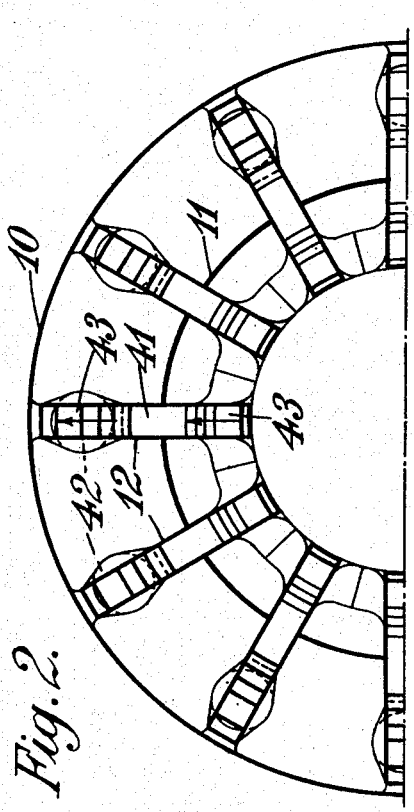
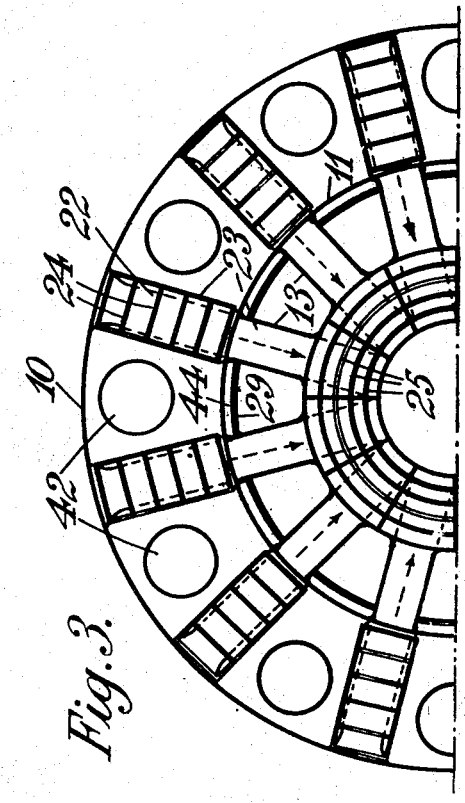
INVENTOR
A. A. GRIFFITH
by Wilkinson Mawhinney
Attys.

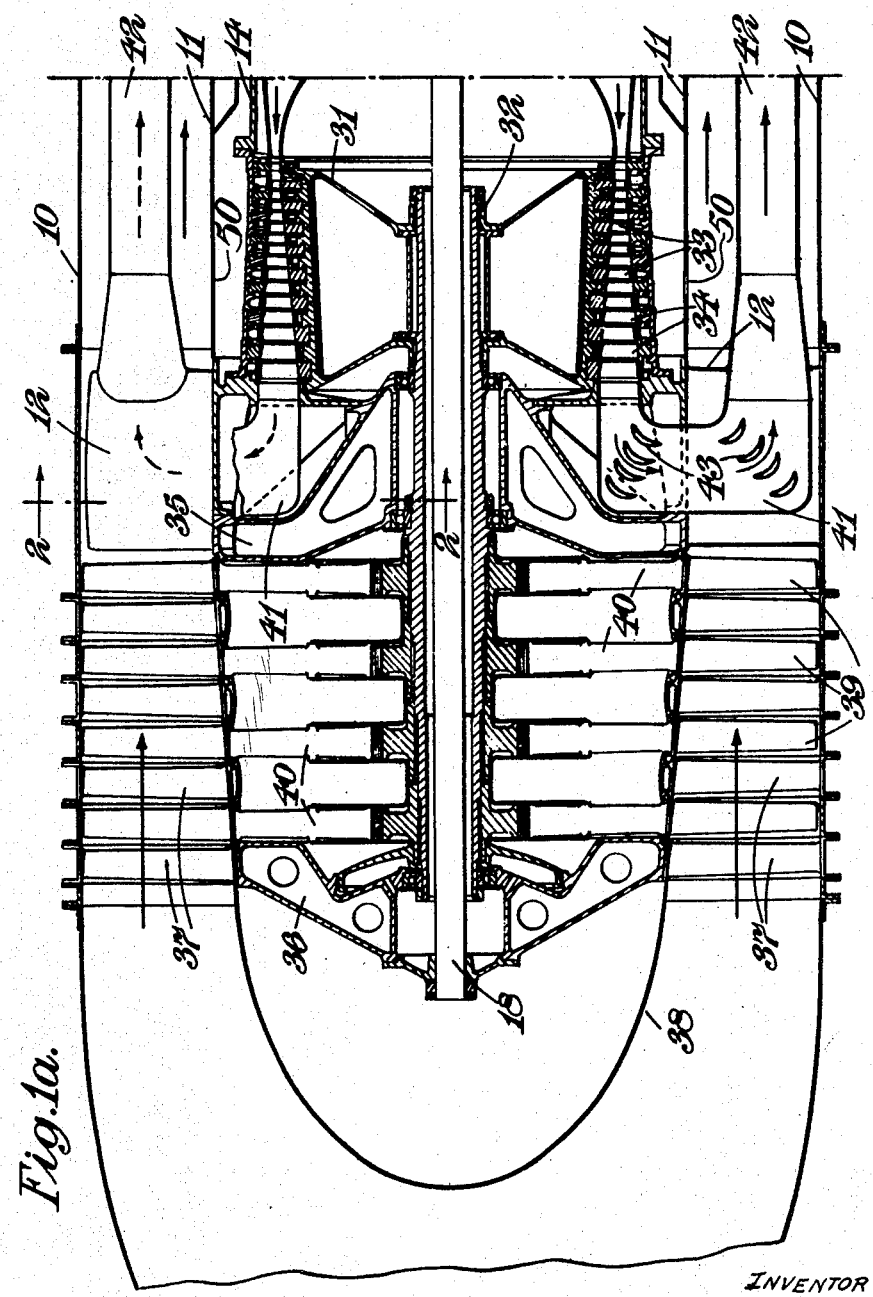

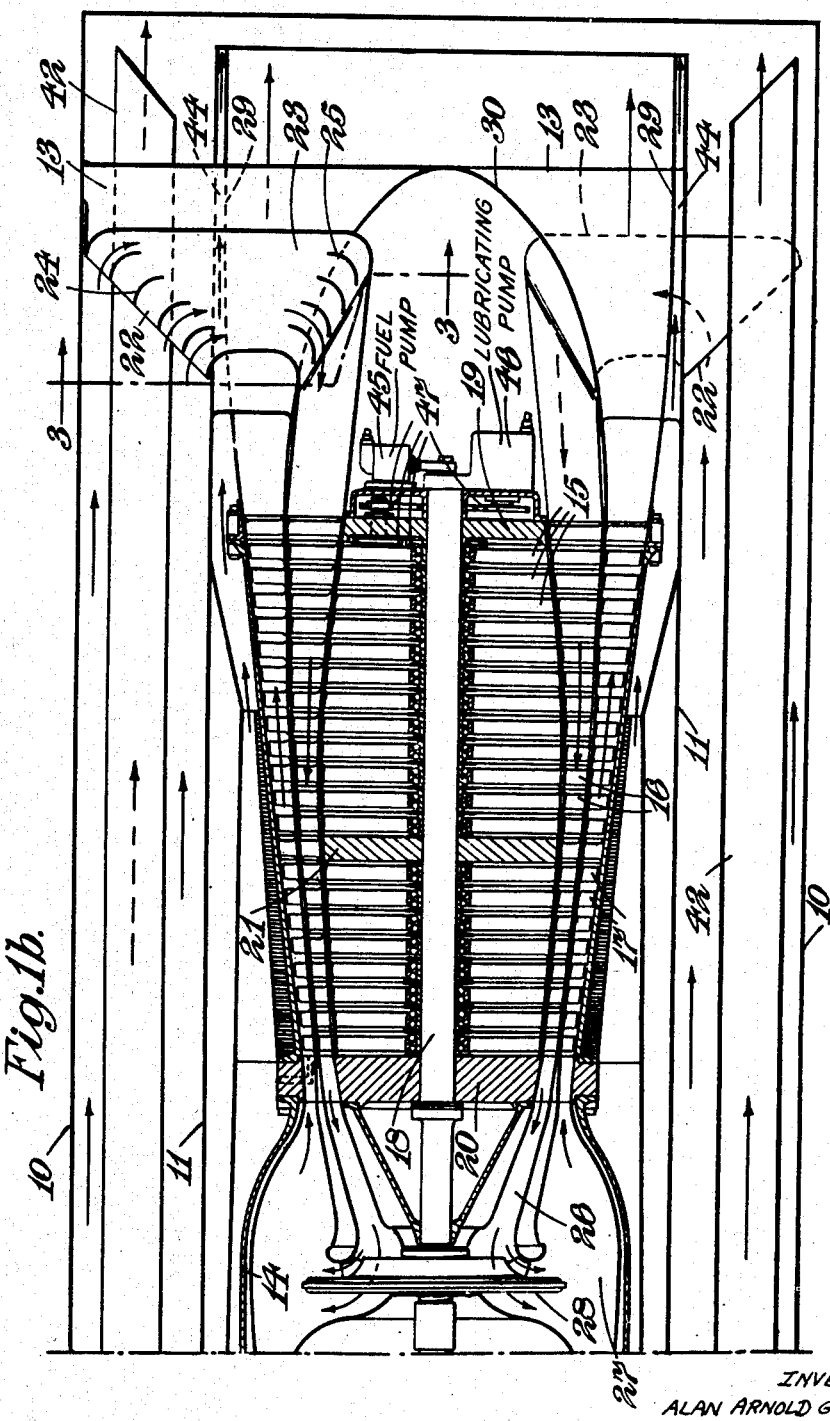

Patented Aug. 15, 1950

2,519,130

UNITED STATES PATENT OFFICE 2,519,130

COMPOUND GAS-TURBINE POWER PLANT WITH PARALLEL FLOW TURBINES

Alan Arnold Griffith, Derby, England, assignor to Rolls-Royce Limited, Derby, England, a British company Application July 29, 1946, Serial No. 686,817
In Great Britain April 23, 1945

Section 1, Public Law 690, August 8, 1946
Patent expires April 23, 1965

11 Claims. (Cl. 60—35.6)

This invention relates to gas-turbines and has for its object to provide an improved construction of a gas-turbine power-plant which is particularly suitable for use as an aircraft-propulsion unit, although it is not limited to such uses and may provide power for driving any desired load.

According to this invention, a gas-turbine power-plant comprises in combination two turbines both of which are supplied from the same source of working fluid and both of which exhaust to the same back-pressure, a main compressor for the working fluid driven by one turbine and constituting the only load therefor, means for deriving useful mechanical work from the second turbine, and a compressor or fan also driven by the second turbine, said compressor or fan precompressing the supply to the first mentioned compressor.

According to another feature of this invention the second turbine drives a fan or propeller situated in an air duct and constituting the propelling unit of an aircraft, and the supply of air to the main compressor is taken from said duct on the delivery side of said fan.

According to another feature of this invention the main compressor and the turbine which drives it comprises a series of oppositely rotating rotor elements each of which carries a series of blades, the whole constituting an axial compressor, together with a second series of turbine blades arranged radially beyond the compressor blades, and constituting an axial flow turbine. This turbine and compressor unit is of the contraflow type, in so far as the gas-flow through the turbine and the air-flow through the compressor are effected axially in opposite directions.

According to yet another feature of this invention the various elements which are combined in the power-plant are all arranged co-axially, with a combustion chamber situated centrally and receiving compressed air from the contra-flow unit situated on one side of it, and delivering the products of combustion to the turbine blades of this unit; the second or power-turbine is arranged on the other side of the combustion chamber, so that there is a divided flow therefrom axially in two directions, and the fan driven by the power-turbine is situated axially beyond it.

According to yet another feature of this invention the power-driven fan operates in an annular duct which surrounds the whole power unit, and extends lengthwise thereof to supply a propulsion jet, and the air-supply for the contra-flow turbine-compressor unit is taken from this duct on the delivery side of the fan.

According to yet another feature of the invention the exhaust from the two turbines is delivered into the annular duct beyond the air-intake of the contra-flow compressor unit, so as to be available in the propulsion jet.

A power plant in accordance with this invention will now be described, by way of example only, with reference to the accompanying drawings in which:

Figures 1a and 1b together form an axial section to the power plant;

Figure 2 is a section on the line 2—2 of Figure 1a,

Figure 3 is a section on the line 3—3 on Figure 1b, and

Figure 4 is a fragmentary perspective view of the turbine rotors showing the blading thereon.

The power plant comprises a suitable streamlined casing 10 which is open at its front end, the left hand end in Figure 1a, for the intake of air and terminates at its rear end in a propulsion jet 49. A second casing 11 is mounted within the casing 10 and is supported therefrom by radial struts 12 at its front end and radial struts 13 at its rear end.

The third casing 14 is mounted within the casing 11 and contains a main compressor and a turbine driving the compressor at its rear end, a combustion chamber in its central portion and a power turbine in its forward portion.

The main compressor and the turbine driving it comprise a series of rotors 15 which carry each an inner ring of compressor blades 16 and an outer ring of turbine blades 17. The turbine blades are so arranged that the rotors rotate alternatively in opposite directions. (See Figure 4.)

The rotors 15 are mounted to rotate on a fixed shaft 18 which is supported from the casing 14 by fixed discs 19 and 20 at each end of the unit and an intermediate fixed disc 21. The fixed discs 19, 20 and 21 have rings of fixed compressor blades and turbine blades.

The compressor takes in air through air intakes 22 in the forward faces of the struts 13 and through passages 23 extending through the struts and then forwardly to the inlet to the compressor. Guide vanes 24 and 25 serve to accelerate the air flow around the bends. The compressed air is delivered through a passage 26 into a combustion chamber 27 in which fuel is burnt in it. The fuel is sprayed into the combustion chamber by a burner 28.

The products of combustion divide in the combustion chamber and part flows back through the turbine driving the compressor and is discharged through the annular space between an extension 29 of the casing 14 and a cowl 30 mounted on the rear end of the compressor-turbine unit.

The remainder of the products of combustion flows forwardly through the power turbine which comprises a drum 31 secured on a hollow shaft 32 and carrying the rotating blades 33. Stator blades 34 are carried by the casing 11. The shaft 32 is supported by a spider 35 from the casing 11 and by a spider 36 which in turn is supported by one set of stator fan blades 37 from the casing 10. The spider 36 also supports the forward end of the shaft 18 and is enclosed by a cowl 38 providing a smooth entry to the annular duct between the casings 10 and 11.

The multi-stage fan is arranged between the spiders 35 and 36 and comprises the stator blades 37 and rotating blades 39 which are supported by means of stems 40 from the hollow shaft 32, so that the fan is driven by the power turbine. The multi-stage fan takes in air through the forward end of the casing 10, compresses it and delivers it rearwardly through the annular duct between the casings 10 and 11. Part of this air enters the air intakes 22 and passes through the main compressor so that the fan acts as a first stage compressor. The remainder of the air delivered by the fan is discharged from the rear end of the casing 10 as a propulsive jet.

The gas discharged from the forward end of the power turbine escapes through a plurality of radial exhaust ducts 41 formed in the struts 12 and through a plurality of exhaust pipes 42 which extend rearwardly and pass through spaces between struts 13 so as to discharge the exhaust gases rearwardly of the air intakes 24. The exhaust gas is thus kept separate from the air which is taken in at the air intake 22. Further, the exhaust gas is partly cooled and pre-heats the air taken in through the air intakes 22 to a certain extent.

It will be noted that the whole of the exhaust gas from both turbines is discharged rearwardly through the propulsion jet to assist the propulsion of aircraft in which the power unit is mounted.

The exterior of the casing 14 is cooled by air which enters through suitable openings 50 at the forward end of the casing 11 and flows rearwardly between casing 11 and 14 and is discharged through the annular space 44 between casings 11 and 29. The circulation of the cooling air is maintained by the ejector action of the exhaust from the contra-flow turbine-compressor unit.

The various auxiliaries used on the power plant may be driven in any suitable manner. The fuel and lubricating pumps 45 and 46 which must be in operation at all times, are situated at the rear of the power plant and driven by gearing 47 from the rearmost rotor 15 of the turbine-compressor unit.

In the particular example illustrated, the contra-flow turbine-compressor unit comprises twenty rotor elements 15 and somewhat more than half the gas from the combustion chamber is delivered through this turbine to do the work of compression. The remainder of the gas drives the power-turbine which has eight stages and which drives the four-stage fan.

About a third of the air delivered by this fan is taken into the main compressor and gives a degree of supercharge to this compressor. With this arrangement, the two turbines operate under practically the same pressure ratio as the main compressor and this is of advantage in that it minimises leakage in the contra-flow turbine compressor unit and ensures freedom from surging.

The power turbine operates at a speed such that the blade-stresses in it approximate to those in the other turbine so that the same gas temperature is permissible in both of them and both can therefore be supplied from the same combustion chamber.

This invention provides a power-plant which has a high power/weight ratio suitable for use in aircraft and which also is of small overall dimensions, and of a shape which lends itself to installation in an aircraft giving minimum head resistance and drag.

I claim:

1. A gas-turbine power-plant comprising a first axial-flow turbine; a first compressor coaxial with and driven by said first turbine and constituting the only load therefor; a combustion chamber; an inlet duct connecting the discharge of said first compressor and said combustion chamber; a first outlet duct connecting said combustion chamber and the inlet of said first turbine; a second axial-flow turbine coaxial with but rotatable independently of said first turbine; a second outlet duct connecting said combustion chamber and the inlet of said second turbine; a low-pressure compressor coaxial with and driven by said second turbine; and an intake for said first compressor arranged to receive air compressed by said low-pressure compressor.

2. A gas-turbine power-plant according to claim 1, wherein said combustion chamber is arranged axially between said turbines.

3. A gas-turbine power-plant according to claim 2 wherein said low-pressure compressor is mounted on the side of said second turbine remote from said combustion chamber.

4. A gas-turbine power-plant comprising a series of oppositely rotating rotor elements each carrying a first series of blades which constitute a first axial-flow gas-turbine and a second series of blades radially inside said first series and constituting a first compressor coaxial with and driven by said first turbine and constituting the only load therefor; a combustion chamber; an inlet duct connecting the discharge of said first compressor and said combustion chamber; a first outlet duct connecting said combustion chamber and the inlet of said first turbine; a second axial-flow turbine coaxial with but rotatable independently of said first turbine; a second outlet duct connecting said combustion chamber and the inlet of said second turbine; a low-pressure compressor coaxial with and driven by said second turbine; and an intake for said first compressor arranged to receive air compressed by said low-pressure compressor.

5. A gas-turbine power-plant according to claim 4 wherein said combustion chamber is arranged axially between said turbines.

6. A gas-turbine power-plant according to claim 5 wherein said low-pressure compressor is mounted on the side of said second turbine remote from said combustion chamber.

7. A gas-turbine power-plant for an aircraft comprising a first axial-flow turbine; a first compressor coaxial with and driven by said first turbine and constituting the only load therefor; a combustion chamber; an inlet duct connecting the discharge of said first compressor and said combustion chamber; a first outlet duct connecting said combustion chamber and the inlet of said first turbine; a second axial-flow turbine coaxial with but rotatable independently of said first turbine; a second outlet duct connecting said combustion chamber and the inlet of said second turbine; an annular duct surrounding said first turbine, said first compressor, said combustion chamber and said second turbine; a low-pressure axial-flow compressor coaxial with and driven by said second turbine and having blading located in said annular duct; an intake for said first compressor arranged in said annular duct to receive air compressed by said low-pressure compressor; and a discharge orifice for said annular duct on the side of said intake axially remote from said low-pressure compressor.

8. A gas-turbine power-plant according to claim 7 further comprising a first exhaust duct for said first turbine connecting with said annular duct at said discharge orifice; and a second exhaust duct for said second turbine connecting with said annular duct between said intake and said discharge orifice.

9. A gas-turbine power-plant according to claim 8 comprising a first series of hollow struts extending across said annular duct, supporting said two turbines, said two compressors and said combustion chamber from the outer wall of said annular duct and forming part of said intake; air intake ports for said intake formed in said first series of struts; a second series of hollow struts extending across said annular duct, supporting said two turbines, said two compressors and said combustion chamber and forming part of said second exhaust duct, said second series of struts being located between said low pressure compressor and said second turbine; and a series of passages forming part of said second exhaust duct and extending one from each strut of said second series of struts, each to an outlet on the side of said first series of struts axially remote from said second series of struts.

10. A gas-turbine power-plant comprising a first turbine, a main compressor driven by said first turbine and constituting substantially the whole load of said first turbine, combustion means, inlet duct means connecting the discharge of said main compressor to supply said combustion means, a second turbine, first outlet duct means connecting said combustion means and said first turbine, second outlet duct means connecting said combustion means with said second turbine, a load driven by said second turbine and comprising a second compressor, a discharge duct for said second compressor, and air intake means for said main compressor in said discharge duct.

11. An aircraft-propulsion gas turbine power plant comprising a first turbine, a main compressor driven by said first turbine and constituting substantially the whole load of said first turbine, combustion means, inlet duct means connecting the discharge of said compressor to supply said combustion means, a second turbine, first outlet duct means connecting said combustion means and said first turbine, second outlet duct means connecting said combustion means with said second turbine, a load driven by said second turbine and comprising a second compressor, a discharge duct for said second compressor, air intake means for said main compressor in said discharge duct, exhaust ducts from said turbines, and rearwardly directed outlets from said discharge duct and said exhaust ducts.

ALAN ARNOLD GRIFFITH.

REFERENCES CITED

The following references are of record in the file of this patent:

UNITED STATES PATENTS

| Number | Name | Date |
| --- | --- | --- |
| 2,131,781 | Lysholm | Oct. 4, 1938 |
| 2,168,726 | Whittle | Aug. 8, 1939 |
| 2,219,994 | Jung | Oct. 28, 1940 |